United States Patent
Henn et al.

(10) Patent No.: US 12,410,860 B2
(45) Date of Patent: Sep. 9, 2025

(54) OIL DUCT PART TO BE MOUNTED IN A TRANSMISSION

(71) Applicant: Robert Bosch GmbH, Stuttgart (DE)

(72) Inventors: Andreas Henn, Aalen (DE); Benjamin Lukas Mehnert, Schwieberdingen (DE); Manfred Saretzki, Stuttgart (DE); Martin Armbruster, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/714,614

(22) PCT Filed: Nov. 7, 2022

(86) PCT No.: PCT/EP2022/080920
§ 371 (c)(1),
(2) Date: May 30, 2024

(87) PCT Pub. No.: WO2023/099120
PCT Pub. Date: Jun. 8, 2023

(65) Prior Publication Data
US 2025/0020204 A1    Jan. 16, 2025

(30) Foreign Application Priority Data
Nov. 30, 2021    (DE) .................... 10 2021 213 489.0

(51) Int. Cl.
*F16H 57/04*    (2010.01)
(52) U.S. Cl.
CPC ..... *F16H 57/0457* (2013.01); *F16H 57/0423* (2013.01); *F16H 57/045* (2013.01)
(58) Field of Classification Search
CPC ............. F16H 57/0409; F16H 57/0423; F16H 57/045; F16H 57/0457; F16H 57/0495; F16H 2057/02043
See application file for complete search history.

(56) References Cited

U.S. PATENT DOCUMENTS

| 3,529,698 A | 9/1970 | Nelson |
| 8,931,596 B2 * | 1/2015 | Shioiri ............... F16H 57/0423 184/6.12 |

(Continued)

FOREIGN PATENT DOCUMENTS

| CN | 113932003 A | * | 1/2022 |
| CN | 117704040 A | * | 3/2024 |

(Continued)

OTHER PUBLICATIONS

Translation of International Search Report for Application No. PCT/EP2022/080920 dated Jan. 19, 2023 (2 pages).

(Continued)

*Primary Examiner* — Adam D Rogers
(74) *Attorney, Agent, or Firm* — Michael Best & Friedrich LLP

(57) ABSTRACT

An oil duct part includes a conduit with an inlet port and an outlet port. The conduit has an oil conducting direction (F) from the inlet port to the outlet port and has a conduit wall that is closed all around perpendicularly to the oil conducting direction (F). The oil duct part further includes at least one oil collection region for collecting oil conducted through the conduit. The oil duct part also includes at least one drain for oil from the at least one oil collection region. The at least one oil collection region includes a first reservoir having a first reservoir wall and a first reservoir base. The conduit adjoins the reservoir wall of the first reservoir in such a way that the first reservoir base is arranged between the inlet port and the outlet port when viewed in the oil conducting direction (F) of the conduit.

20 Claims, 4 Drawing Sheets

(56) References Cited

U.S. PATENT DOCUMENTS

| | | | |
|---|---|---|---|
| 9,074,679 B2 * | 7/2015 | Araki | F16H 57/0457 |
| 9,103,432 B2 * | 8/2015 | Isomura | F16H 57/0427 |
| 9,528,593 B2 | 12/2016 | Tage et al. | |
| 9,581,236 B2 * | 2/2017 | Tage | F16H 57/0431 |
| 10,746,282 B2 | 8/2020 | Ito et al. | |
| 10,859,152 B2 * | 12/2020 | Yu | F16H 57/0475 |
| 11,486,486 B2 * | 11/2022 | Trinh | F16H 57/0423 |
| 12,055,210 B2 * | 8/2024 | Hirata | F16H 57/0483 |
| 12,331,827 B2 * | 6/2025 | Krause | F16H 57/0457 |
| 2004/0154846 A1 | 8/2004 | Kira | |
| 2011/0214947 A1 * | 9/2011 | Tuomas | F16H 57/0423 |
| | | | 184/6.12 |
| 2011/0319215 A1 | 12/2011 | Katoh et al. | |
| 2013/0283955 A1 | 10/2013 | Araki et al. | |
| 2019/0186622 A1 | 6/2019 | Ishikawa et al. | |
| 2024/0110622 A1 * | 4/2024 | Krause | F16H 57/0493 |
| 2024/0318717 A1 * | 9/2024 | Cheron | F16H 57/045 |
| 2025/0020201 A1 * | 1/2025 | Henn | F16H 57/045 |
| 2025/0020202 A1 * | 1/2025 | Hegedus | F16H 57/045 |

FOREIGN PATENT DOCUMENTS

| | | | | |
|---|---|---|---|---|
| DE | 1291966 B | | 4/1969 | |
| DE | 102007021686 A1 | * | 11/2008 | F16H 57/0447 |
| DE | 102017108748 B3 | | 8/2018 | |
| DE | 102019006118 A1 | | 3/2020 | |
| DE | 102020204587 A1 | * | 11/2020 | F16H 57/0409 |
| DE | 102012215355 B4 | * | 9/2021 | F16H 57/027 |
| DE | 102021211977 A1 | * | 4/2023 | F16H 57/0423 |
| DE | 202023002785 U1 | * | 8/2024 | |
| DE | 102024107189 A1 | * | 9/2024 | F16H 57/0423 |
| EP | 2700849 A1 | | 2/2014 | |
| EP | 3018386 A1 | * | 5/2016 | F16H 57/0423 |
| EP | 3026300 A1 | * | 6/2016 | F16H 57/0423 |
| FR | 3091736 A1 | * | 7/2020 | B60K 6/36 |
| GB | 1115446 A | * | 5/1968 | |
| JP | 2002054729 A | * | 2/2002 | |
| JP | 2004092894 A | * | 3/2004 | F16H 57/0421 |
| JP | 2005083491 A | | 3/2005 | |
| JP | 2010202190 A | | 9/2010 | |
| JP | 4573410 B2 | * | 11/2010 | |
| JP | 2015086926 A | * | 5/2015 | F16H 57/0423 |
| JP | 2017227321 A | | 12/2017 | |
| JP | 2020034127 A | * | 3/2020 | F16H 57/0409 |
| JP | 2020112245 A | * | 7/2020 | B60K 6/387 |
| JP | 2021021466 A | | 2/2021 | |
| JP | 2021038823 A | | 3/2021 | |
| KR | 20220168021 A | | 12/2022 | |
| WO | WO-2024183846 A1 | * | 9/2024 | |

OTHER PUBLICATIONS

Non-final Office Action issued by the U.S. Patent Office for U.S. Appl. No. 18/714,239, dated May 19, 2025 (15 pages).

Non-final Office Action issued by the U.S. Patent Office for U.S. Appl. No. 18/714,271, dated Mar. 7, 2025 (15 pages).

\* cited by examiner

OIL DUCT PART TO BE MOUNTED IN A TRANSMISSION

BACKGROUND

In the prior art, transmissions for motor vehicles are in particular also used in combination with an electromotive drive. As with conventional transmissions, the transmission elements of the transmission must also be lubricated with oil. In order to increase transmission efficiency and reduce costs, an oil pump often used in conventional transmissions for transmission lubrication can be omitted. Lubrication and cooling of the transmission elements is preferably achieved by passive oil distribution. Lubrication of the rotating transmission elements is important for transmission reliability. Insufficient lubrication may cause a lack of supply of oil to the bearings of the transmission elements and the sealing rings. This may lead to increased wear and even failure of the transmission elements.

An oil duct part to be mounted in a motor vehicle transmission is known from DE 10 2017 108 748 B3. The illustrated transmission includes a transmission housing and at least one transmission gear arranged in the transmission housing and arranged at least partially in an oil sump of the transmission. One section of the rotating transmission gear rolls through the oil sump and receives oil in the process. A process that is often described in technical terms as splashing. In order to distribute oil received by the transmission gear more precisely in the transmission, a goggle-like oil duct part is used, which can be inserted into the transmission as an insert part. The oil duct part comprises a plurality of orifices and a conduit having an inlet port and an outlet port, wherein the conduit has an oil conducting direction from the inlet port to the outlet port and a conduit wall that is closed all around perpendicularly to the oil conducting direction. In DE 10 2017 108 748 B3, the conduit wall is formed by a half-arc hollow body curved about a gear axis of a transmission gear, which is in a predetermined installation state of the oil duct part predominantly above an oil sump level of the transmission. The curved conduit has an inlet port formed as a catch jaw for receiving oil which is thrown up by another transmission gear meshing with the transmission gear surrounded by the half-arch hollow body and transported further from the second transmission gear to the catch jaw. In DE 10 2017 108 748 B3, an end section of the half-arch hollow body, which faces away from the catch jaw and is closed except for a throttle bore, forms an oil collection region for collecting oil conveyed through the conduit. The throttle bore forms the only outlet port of the conduit and therefore simultaneously represents a drain for the oil from the at least one oil collection region. The throttle bore is located vertically above the meshing region of the two transmission gears, such that the oil flows off into the meshing region and wets the contact surfaces of the teeth.

SUMMARY

The invention relates to an oil duct part to be mounted in a transmission, in particular a motor vehicle transmission, wherein the oil duct part comprises a conduit with an inlet port and an outlet port, wherein the conduit has an oil conducting direction from the inlet port to the outlet port and having a conduit wall that is closed all around perpendicularly to the oil conducting direction, wherein the oil duct part further comprises at least one oil collection region for collecting oil conducted through the conduit, wherein the oil duct part also comprises at least one drain for oil from the at least one oil collection region. According to the invention, it is proposed that the at least one oil collection region comprises a first reservoir, wherein the first reservoir has a first reservoir wall and a first reservoir base, wherein the conduit adjoins the reservoir wall of the first reservoir in such a way that the first reservoir base is arranged in between the inlet port and the outlet port when viewed in the oil conducting direction of the conduit.

In the context of the present application, an "oil" is to be understood as a gear-driven liquid lubricant, regardless of whether it is commercially marketed as oil. In particular, it may be a lubricant or similar substance referred to as an ATF (Automatic Transmission Fluid).

A predetermined installation state defining an orientation of the oil duct part in the transmission relative to the gravitational force is understood to mean an installation state representing a particular orientation of the oil duct part relative to the transmission housing with a known orientation of the associated transmission relative to the earth's gravitational field. The orientation of the transmission relative to the earth's gravitational field is generally known for a normal position of the transmission, wherein the normal position is the position in which the transmission is oriented relative to the gravitational force in the intended application. If the transmission is a motor vehicle transmission, the transmission assumes a certain orientation to the gravitational force of the earth when the motor vehicle is horizontally aligned relative to the earth's gravitational field in the normal position. This applies regardless of whether the motor vehicle is actually moving horizontally to the earth's gravitational field or whether it is traveling on a slope with an inclination angle. From a previously known installation position of the transmission in the motor vehicle, it is therefore generally possible to derive how an oil duct part is to be installed in the transmission so that the oil duct part assumes a certain orientation relative to the gravitational force in the normal position. As the inclination angle only deviates very moderately by +/−20° from the horizontal when driving downhill or uphill in most possible driving conditions of the vehicle, the installation state is adjusted to a horizontal vehicle position in the geometrical design of the oil duct part.

An oil duct part is understood to mean a component comprising at least one conduit for oil transport. The oil duct part may be configured to distribute oil supplied to the oil duct part under the influence of the gravitational force in the oil duct part. The oil duct part may in particular be configured as an insert part, which is inserted into the transmission during assembly. The oil duct part may be made of plastic or metal or a plastic-metal composite. The oil duct part may have a one piece or multiple piece design. In particular, it is possible to assemble the oil duct part from two or more shell parts, which are mechanically connected to each other via catch connections or clip connections.

In the context of the present application, relative to an assumed reference point, the terms "below" or "underneath" denote a position at a point lower in the direction of the gravitational force and the terms "above" or "over" denote a position at a point higher in the direction of the gravitational force, wherein an orientation of the oil duct part corresponding to the predetermined installed state is assumed.

An oil sump of the transmission is understood to mean a region within the transmission housing in which oil accumulates under the influence of the gravitational force. A transmission gear that is arranged at least partially in an oil sump of the transmission is understood to mean a transmission gear that is submerged in the oil sump with a lower part in the direction of the gravitational force, while an upper part of the transmission gear protrudes out of the oil sump. Upon rotation of the transmission gear, it receives oil from the oil sump and transports it to a release point or break-off point in the opposite direction of the gravitational force. This process is referred to as "splashing." The circulation and delivery rate of the oil through the transmission gear depend directly on the speed and, via the viscosity, also on the temperature. The amount of oil removed from the oil sump by a transmission gear causes the level of the oil sump to decrease during operation. The transmission gear may, therefore, be considered an oil conveying transmission gear. Oil splashed from the transmission gear and possibly further transmission gears during rapid rotation in the transmission housing can reach locations from which there is no rapid return to the oil sump. These amounts of oil are called splash losses. To ensure that sufficient oil is still being conveyed from the transmission gear and the transmission does not run dry, the oil sump must have an appropriate amount of oil. On the other hand, too much oil in the oil sump is not desirable as this increases disadvantageous drag losses of the transmission. As a compromise, it is therefore desirable to supply the amount of oil removed by the transmission gear as specifically as possible to the lubrication points in the gear transmission in order to avoid splash losses and to be able to lower the level in the oil sump to a level at which drag losses of the transmission are minimized. This is achieved by the oil duct part.

The oil duct part according to the invention allows a more targeted oil supply of bearings of rotating transmission elements within a transmission housing. This is achieved by the formation of a first reservoir comprising a first reservoir wall and a first reservoir base in combination with a specifically formed conduit, wherein the conduit adjoins the reservoir wall of the first reservoir such that the first reservoir base is arranged, when viewed in the oil conducting direction of the conduit, between the inlet port and the outlet port of the conduit. In particular, the oil duct part is advantageously configured to be installed in a transmission in a predetermined installation state defining an orientation of the oil duct par relative to the gravitational force, wherein, in an orientation that corresponds to the predetermined installation state, the first reservoir base is oriented approximately perpendicular to the gravitational force and the oil conducting direction extends from the inlet port to the outlet port in the opposite direction to the gravitational force. The oil duct part according to the invention can in particular be installed in a transmission such that in the predetermined installation state, the inlet port of the conduit can be positioned on the end face of a transmission gear of the transmission and the first reservoir base floor above the transmission gear. Oil received in the conduit through the inlet port may be transported up to the outlet port in the opposite direction of the gravitational force, wherein oil exiting the outlet port may accumulate in the first reservoir.

In contrast to the solutions known from the prior art in which the oil collection region forms the end area of a half-arch hollow body curved about a gear axis, in the present invention the oil collection region comprises a first reservoir which can be arranged above the oil conveying transmission gear. The oil that accumulates in the first reservoir causes the oil sump at the base of the transmission housing to lower during operation. The conduit is configured as a simple, circumferentially closed channel, which can extend from the inlet port to an outlet port, preferably in a straight line. The port cross-section of the inlet port may correspond to the port cross-section of the outlet port. The conduit with the circumferential conduit wall represents a conduit integrated into the oil conduit part.

In contrast to the prior art, the oil duct part is configured such that the oil does not accumulate in the conduit but outside the conduit in the first reservoir. This has the advantage that sufficient lubrication of the transmission bearings is also possible in the event of speed fluctuations, as the supply contained in the first reservoir can initially be used to supply the lubrication points during operation. At least one drain, but preferably several outlets, may be present at the first reservoir to realize the oil supply to different bearings in the transmission. Advantageously, compared to the prior art, the amount of oil conveyed through the conduit during operation may be configured to be more independent of the amount of oil drained from the oil collection region via a drain. The conduit serves only to fill the first reservoir, while draining from the first reservoir can be adjusted via the geometrical design of the reservoir and the geometrical design of at least one drain from the reservoir. The oil supply to bearing points of the transmission elements can therefore be advantageously optimized both locally and with regard to time. In particular in transmissions in which rotating transmission elements are arranged above one another in multiple planes in relation to the gravitational force, this enables improved lubrication of the bearing points.

As the first reservoir may be advantageously used as an intermediate reservoir, faster lubrication is available when the electric machine driving the transmission is reactivated, even if it is deactivated for short periods. During longer downtimes, however, the first reservoir can also drain completely in the direction of the oil sump via a small drain port in the first reservoir base.

Advantageous embodiments and further embodiments of the invention are made possible by the features indicated in the dependent claims.

Advantageously, an end of the conduit wall of the conduit facing away from the inlet port may form a circumferential wall projecting above the first reservoir base of the first reservoir and delimiting the outlet port such that oil exiting the outlet port of the conduit collects in the first reservoir, draining in the direction of the gravitational force. Oil draining over the circumferential wall can thus advantageously drain directly into the first reservoir and fill it.

Advantageously, the conduit can be formed in a straight line. This allows the oil supplied to the conduit to be transported towards the outlet port with as little obstruction as possible. The straight-line conduit may be aligned in a transmission in particular so that it extends tangentially to an end face of a transmission gear in the predetermined installation state. The inlet port of the conduit can be configured as a catch jaw, for example, wherein the circumferential edge of the inlet port can be beveled according to the tangential angle of the conduit, so that the inlet port can be brought as close as possible to the end face of the transmission gear. The contour of the circumferential edge can be adapted to the radius of curvature of the end face of a transmission gear. In an orientation of the oil duct part which corresponds to the predetermined installation state, oil exiting the outlet port of the conduit drains in the direction of the gravitational force and collects in the first reservoir, which is thereby filled.

For example, the oil collection region of the oil duct part may further comprise a second reservoir, the second reservoir comprising a second reservoir wall and a second reservoir base, wherein the second reservoir is connected to the first reservoir via a connection channel.

The first reservoir and the second reservoir can advantageously be provided with drains. For example, a first drain in the predetermined installation direction may project above the first reservoir base from the first reservoir wall. For example, a second drain in the predetermined installation direction may project above the second reservoir base from the second reservoir wall of the second reservoir. Further exemplary, a third drain may project from the first basin wall of the first reservoir in the predetermined installation direction above the first reservoir base on a side opposite the first drain. The first drain, the second drain, and/or the third drain may supply lubricating oil to different bearings in a transmission. The oil supply to the bearings is advantageously "passive", i.e., by draining the oil via the respective associated drains.

Advantageously, the edge of the circumferential wall of the conduit on a side facing the first reservoir may have a distance from the first reservoir base which is less than the distance of the edge of the circumferential wall from the second reservoir base on a side facing the second reservoir. Oil that is supplied to the oil collection region through the conduit first reaches into the first reservoir and fills it at least partially before the oil reaches the second reservoir via the connection channel. This optionally prevents the oil from draining too early in the direction of a second drain at the first reservoir and ensures that oil is initially supplied to the first drain at the first reservoir. In some respects, therefore, in this exemplary embodiment, the draining of the oil via the first drain and the second drain is cascade-like, wherein the first reservoir is initially filled until oil drains from the oil duct part via the first drain and simultaneously shortly before or even a short time later, the supplied oil begins to fill the second reservoir via the connection channel, such that oil in this example only drains via the second drain after it has already drained via the first drain.

Of course, further reservoirs may also be provided on the oil duct part and/or further drains may be provided at the first or second reservoir, with which further bearings of rotating transmission elements are lubricated with oil.

The oil duct part may advantageously comprise a plurality of holder cams projecting from the oil duct part, preferably on opposite sides of the oil duct part, via which the oil duct part can be inserted in a predetermined installation state in a transmission.

BRIEF DESCRIPTION OF THE DRAWINGS

In the following, possible embodiment examples of the invention are explained with reference to the accompanying drawing. In the drawings.

DETAILED DESCRIPTION

Figure 1:
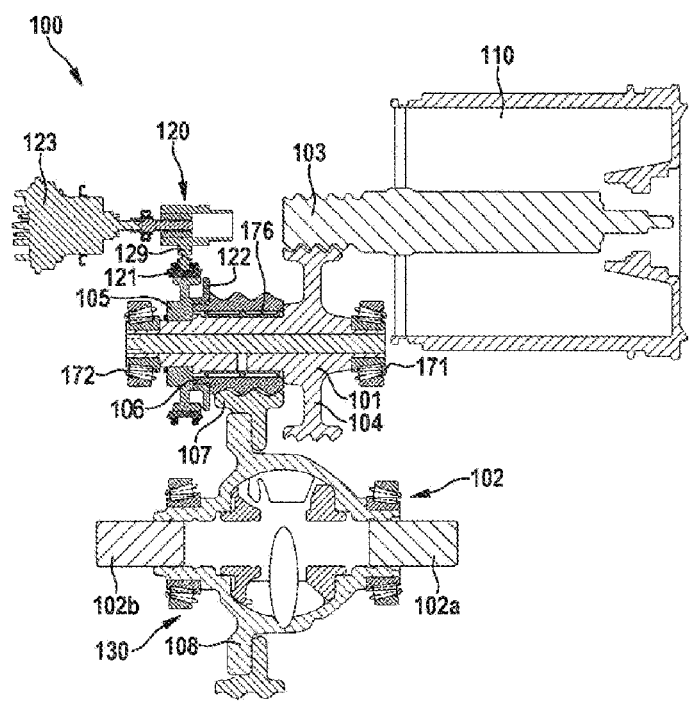
FIG. 1 a cross-sectional view of a transmission of a motor vehicle driven by an electric machine, for explanatory purposes, FIG. 2 a perspective view of an exemplary embodiment of an oil duct part according to the invention for use in a transmission, FIG. 3 a top view of the oil duct part of FIG. 2, FIG. 4 a further perspective view of the oil duct part of FIG. 2 and FIG. 3, FIG. 5 an enlarged detail view of FIG. 6, FIG. 6 a cross-section through a transmission with a transmission housing that corresponds to the illustration of FIG. 1, with an oil duct part inserted therein in a predetermined installation state, as shown in FIGS. 1 to 4.

FIG. 1 shows a propulsion device for a motor vehicle comprising a transmission 100. The description of the transmission serves to explain the possible uses of an oil duct part, as will be described further below.

The transmission 100 is connected on the input side to an electric machine 110 having a rotor shaft 103. The rotor shaft 103 meshes with a gear 104 that is rotationally coupled to a drive shaft 101 of the transmission. The drive shaft 101 is rotatably mounted about its outer circumference at two axially spaced bearing points 171 and 172 in a transmission housing (not shown in FIG. 1).

Furthermore, the transmission 100 comprises a coupling device 120, which can be controlled, for example by means of an electrically actuated rotary actuator 123. For example, the electrical actuator 123 may act via a spindle drive and a shift fork 129 on a coupling element 121 which is axially displaceably mounted on a guide hub 105. For example, the coupling element 121 is annular and may rotate relative to the shift fork 129. The coupling element 121 may have an inner toothing that engages in an external toothing of the guide hub 105 such that the coupling element 121 can be displaced on the guide hub 105 parallel to the axis of the drive shaft 101. The guide hub 105 and the coupling element 121 engaged therewith are mounted on the drive shaft 101 in a rotationally fixed manner. Furthermore, a coupling element 122 is provided that is coupled to a pinion 106 in a rotationally fixed manner. For example, the pinion 106 is rotatably mounted on the drive shaft 101 with a bearing 176 configured as a nail bearing. The coupling element 122 may have external toothing. When the rotary actuator 123 is actuated, the spindle drive displaces the coupling element 121 in the axial direction via the shift fork until the internal toothing of the coupling element 121 engages the external toothing of the coupling element 122, whereby the coupling element 121 is coupled to the coupling element 122 in a rotationally fixed manner. The coupling causes the gear 104, the drive shaft 101, the guide hub 105, the coupling element 121, the coupler element 122, and the pinion 106 to rotate as a block about the axis of the drive shaft 101. When decoupling is performed, the rotary actuator 123 is used to pull the coupling element 121 away from the coupler element 122 in FIG. 1 to the left, thereby disengaging the coupling between the pinion gear 106 and the drive shaft 101. The pinion gear 106 may now rotate about the drive shaft 101.

The pinion gear 106 meshes with a transmission gear 107. The transmission gear 107 is coupled to a differential 130 in a rotationally fixed manner. The differential 130 comprises an output shaft 102 in the form of a first output shaft 102a and a second output shaft 102b that may be rotationally driven with the differential 130. The transmission gear 107 is fixedly connected to the differential cage 108 of the differential 130. As shown in FIG. 7, the differential 130 may be integrated into the transmission housing 140 of the transmission 100.

As already described, the coupling between the pinion 106 and the drive shaft 101 is disengaged in the decoupled state by means of the coupling device 120. If, for example, the electric machine is additionally switched off in a driving state of a motor vehicle, the rotor shaft 103 and the drive shaft 101 are no longer driven. The wheels of the still rolling motor vehicle now drive the transmission gear 107 via the output shaft 102, which meshes with the pinion 106 so that the pinion 106 rotates about the drive shaft 101. Even in this state, it must be ensured that, for example, the bearing 176 of the pinion 106 arranged above the oil sump of the transmission 100 is sufficiently supplied with oil.

Figure 2:
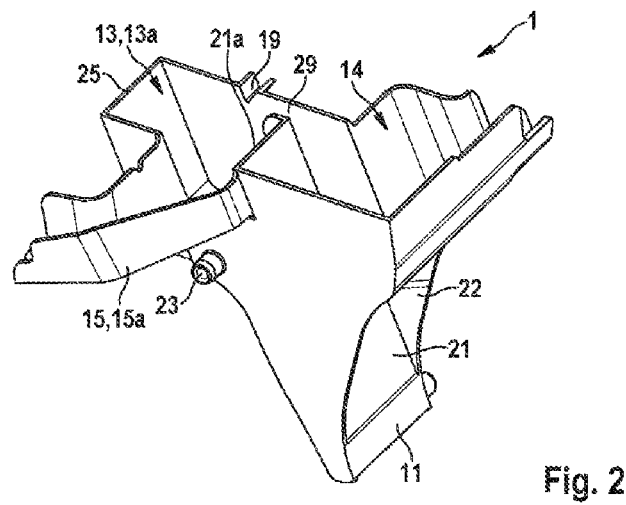
Figure 3:
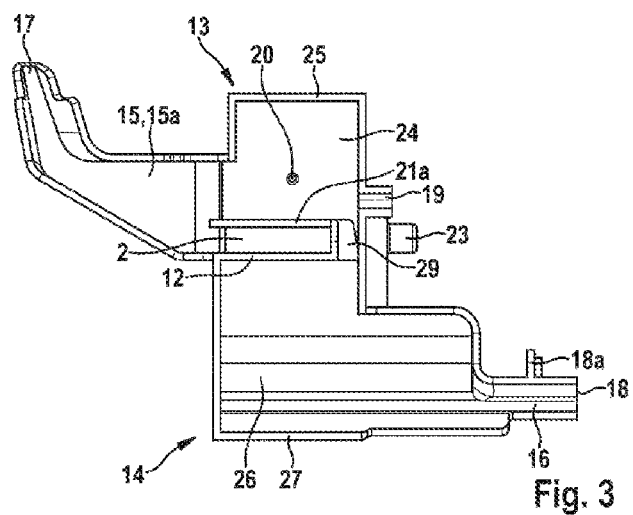
Figure 4:
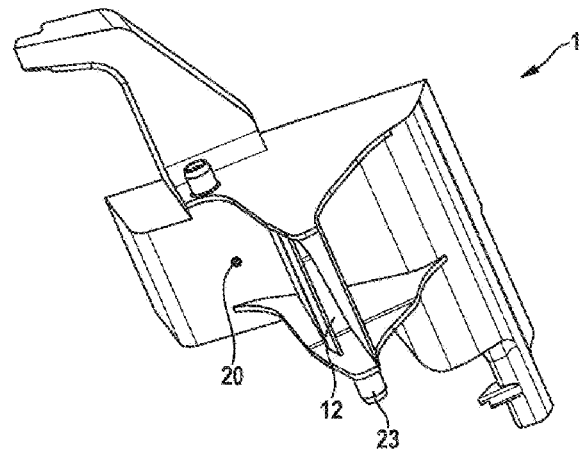

FIG. 2, FIG. 3, and FIG. 4 show an exemplary embodiment of an oil duct part 1 according to the invention, which may be designed to be installed in the transmission 100 shown in FIG. 1, for example. As shown here, the oil duct part 1 may in particular be configured as an insert part, which is inserted into the transmission 100 during assembly of the transmission 100. The oil duct part 1 may be made of plastic or metal or a plastic-metal composite and have a one piece or multiple piece design. In particular, it is possible to assemble the oil duct part from two or more shell parts, which are mechanically connected to each other via catch connections or clip connections.

The oil duct part 1 comprises a conduit 2 having an inlet port 11 and an outlet port 12, wherein the conduit 2 has an oil conducting direction F (shown in FIG. 5) from the inlet port 11 to the outlet port 12 and a conduit wall 21 that is closed all around perpendicularly to the oil conducting direction F. The oil duct part 1 further comprises an oil collection region 13a for the collection of oil conveyed by the conduit 2 and a drain 15a for oil from the oil collection region 13a.

The oil collection region 13a comprises a first reservoir 13. The first reservoir 13 comprises a first reservoir wall 25 and a first reservoir base 24. An end of the conduit wall 21 facing away from the inlet port 11 of the conduit 2 forms a circumferential wall 21a projecting above the first reservoir base 24 of the first reservoir 13 and delimiting the outlet port 12, as can be easily seen in FIG. 2, FIG. 3, and in particular in FIG. 5. The oil duct part 1 further comprises a first drain 15 projecting above the first reservoir base 24 from the first basin wall 25 and having a drain port 17. The first drain 15 is configured as an angled trough. In addition, a further drain 19 can be formed on the upper edge of the first reservoir wall 25, which functions as an overflow. The first reservoir 13 may have a small drain port 20 in the first reservoir base 24 formed as a bore, via which the first reservoir 13 can be emptied during extended downtimes. The diameter of the drain port 20 is configured to be so small that the amount of oil drained via the drain port 20 is significantly smaller than the amount of oil supplied to the conduit 2 during operation.

As further shown in FIG. 2, FIG. 3, and FIG. 4, the oil collection region 13a of the oil duct part 1 comprises a second reservoir 14, wherein the second reservoir 14 comprises a second reservoir wall 27 and a second reservoir base 26. As can be seen in FIG. 3, the second reservoir 14 is connected to the first reservoir 13 via a connection channel 29 (FIG. 3). A second drain 16 projects above the second reservoir base 26 from the second reservoir wall 27 of the second reservoir 14 and has a drain port 18. The second drain 16 can also be configured like a trough. Additionally, the second drain 16 may comprise, for example, a further drain port 18a angled from the drain 16.

The edge of the circumferential wall 21a preferably has, on a side facing the first reservoir 13, a distance from the first reservoir base 24 which is less than the distance of the edge of the circumferential wall 21a from the second reservoir base 26 on a side facing the second reservoir 14.

The oil duct part 1 shown in FIGS. 2 to 4 is adapted to be arranged in the transmission housing 140 of a transmission in a predetermined installation state, which defines an orientation of the oil duct part relative to the gravitational force G. Without being limited thereto, the oil duct part 1 is preferably intended to be inserted into the transmission 100 shown in FIG. 1. To this end, the oil duct part 1 has holder cams 23 projecting from the sides of the oil duct part 1, which allow the oil duct part 1 to be installed and anchored in a transmission housing 140 of the transmission 100 in a predetermined orientation relative to the normal position of the transmission 100. As can be further seen in FIG. 2, the oil duct part 1 may be provided with reinforcing ribs 22 for increasing stability.

Figure 5:
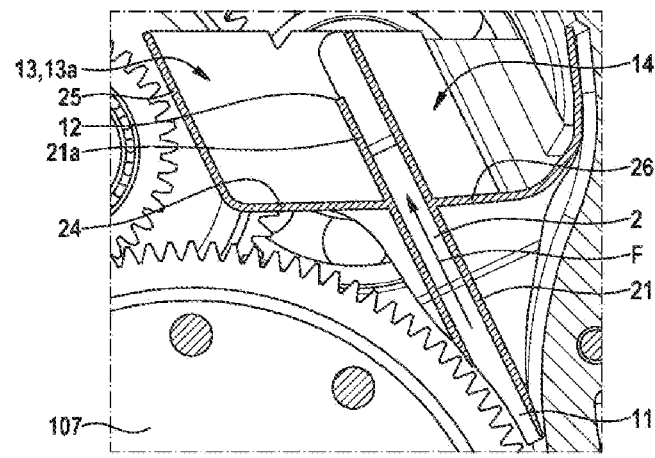
Figure 6:
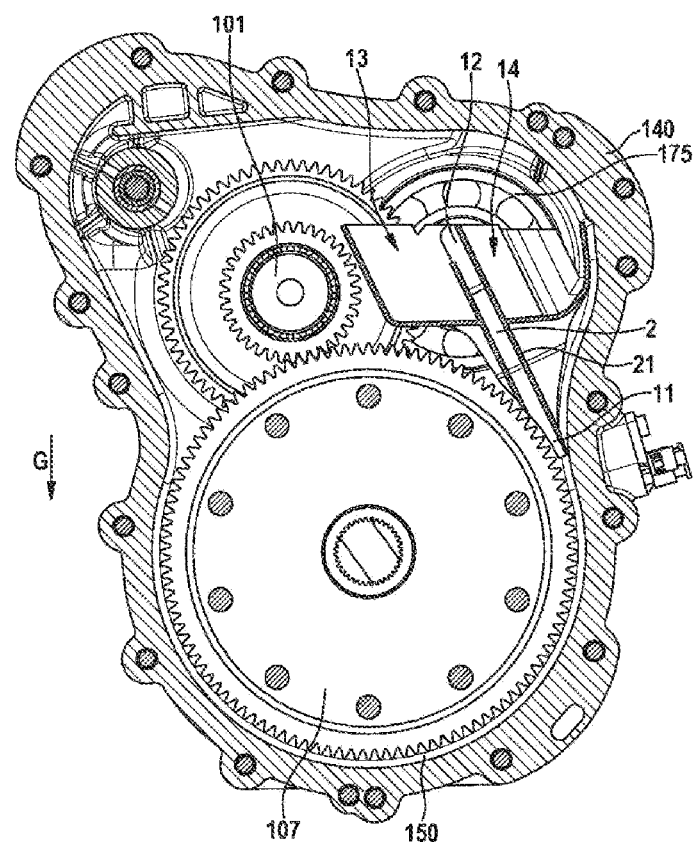

FIG. 6 and the enlarged detail view of FIG. 5 show a transmission 100, the basic structure of which corresponds to the transmission shown in FIG. 1, with the oil duct part 1 of FIGS. 2 to 4 installed therein. It can be seen that the inlet port 11 of the conduit 2 can be positioned on the end face of the transmission gear 107 and in close proximity to the end face of the transmission gear 107, while the first reservoir base 24 of the first reservoir 13 can be positioned above the transmission gear 107. The oil conducting direction F therefore runs from the inlet port 11 to the outlet port 12 in the opposite direction of the gravitational force G, the orientation of which is shown for the normal position of the transmission 100 in FIG. 6.

As shown in FIGS. 5 and 6, the conduit 2 is preferably straight-lined and preferably extends tangentially to an end face of the transmission gear 107 at least in the region of the transmission gear 107. The inlet port 11 can be configured as a catch jaw, wherein the circumferential edge of the inlet port 11 can be beveled according to the angle formed by the direction of the gravitational force and conducting direction F, so that the inlet port 11 can be brought as close as possible to the end face of the transmission gear 107. The contour of the circumferential edge may be adapted to the radius of curvature of the end face of a transmission gear 107 as shown.

The transmission gear 107 of the transmission 100 is partially arranged in an oil sump 150. The transmission gear 107 receives oil from the oil sump 150 and transports it into the inlet port 11 of the conduit 2. The movement pulse of the oil pushes it in the conduit 2 in the oil conducting direction F up to the outlet port 12.

As can be best seen in FIG. 5, in the predetermined installation state of the oil duct part 1, the oil exiting the outlet port 12 of the conduit 2 during operation flows through the circumferential wall 21a in the direction of the gravitational force G and thus in the direction of the first reservoir 13 where it accumulates. As the edge of the circumferential wall 21a has, on a side facing the first reservoir 13, a distance from the first reservoir base 24 which is less than the distance of the edge of the circumferential wall 21a from the second reservoir base 26 on a side facing the second reservoir 14, the oil first flows over the edge of the circumferential wall 21a on the side facing the first reservoir 12, so that this is filled first. Once the oil reaches the connection channel 29, the second reservoir 14 also fills with oil via this. The oil level rising in the first reservoir 13 and the second reservoir 14 reaches the first drain 15 and the second drain 16 after a short time and flows out of the oil duct part 1 under the influence of the gravitational force G via the first drain port 17 and the second drain port 18 and third drain port 18a.

The oil draining from the oil duct part 1 via the first drain 15 and the second drain 18 may be introduced to different bearings of transmission elements in the transmission 100, which may be spatially distant from one another. For example, the first drain 15 may serve to supply oil to the bearing 176 of the pinion 16 in FIG. 1, while the second drain 16 supplies oil to the bearing of a rotor shaft 103.

However, the oil duct part (1) may also be constructed differently than shown in FIGS. 2 to 4. It is understood that by means of the at least one first reservoir and the drains and/or connection channels branching out from it to further reservoirs, an optimum supply of lubricating oil to the bearings of rotating transmission elements can also be optimally adjusted for differently constructed transmissions.

What is claimed is:

1. An oil duct part (1) to be mounted in a transmission (100), said oil duct part (1) comprising a conduit (2) with an inlet port (11) and an outlet port (12), wherein the conduit (2) has an oil conducting direction (F) from the inlet port (11) to the outlet port (12) and has a conduit wall (21) that is closed all around perpendicularly to the oil conducting direction (F), the oil duct part (1) further comprising at least one oil collection region (13a) for collecting oil conducted through the conduit (2), wherein the oil duct part (1) also comprises at least one drain (15a) for oil from the at least one oil collection region (13a), wherein the at least one oil collection region (13a) comprises a first reservoir (13), said first reservoir (13) having a first reservoir wall (25) and a first reservoir base (24), wherein the conduit (2) adjoins the first reservoir wall (25) of the first reservoir (13) in such a way that the first reservoir base (24) is arranged between the inlet port (11) and the outlet port (12) when viewed in the oil conducting direction (F) of the conduit (2), and wherein the at least one drain (15a) includes a first drain (15) that projects from the first reservoir wall (25) in a predetermined installation direction above the first reservoir base (24).

2. The oil duct part (1) according to claim 1, wherein said oil duct part (1) is configured to be installed in the transmission (100) in a predetermined installation state defining an orientation of the oil duct part (1) relative to gravitational force (G), wherein, in an orientation that corresponds to the predetermined installation state, the first reservoir base (24) is orientated approximately perpendicular to the gravitational force (G) and the oil conducting direction (F) extends from the inlet port (11) to the outlet port (12) in an opposite direction to the gravitational force (G).

3. The oil duct part (1) according to claim 1, wherein one end of the conduit wall (21) of the conduit (2) facing away from the inlet port (11) forms a circumferential wall (21a) projecting above the first reservoir base (24) of the first reservoir (13) and delimiting the outlet port (12).

4. The oil duct part (1) according to claim 3, wherein the oil collection region (13a) of the oil duct part (1) comprises a second reservoir (14), wherein the second reservoir (14) has a second reservoir wall (27) and a second reservoir base (26), wherein the second reservoir (14) is connected with the first reservoir (13) via a connection channel (29), and wherein an edge of the circumferential wall (21a) on a side facing the first reservoir (13) has a distance from the first reservoir base (24) which is less than a distance of the edge of the circumferential wall (21a) from the second reservoir base (26) on a side facing the second reservoir (14).

5. The oil duct part (1) according to claim 1, wherein the conduit (2) is configured in a straight line from the inlet port (11) to the outlet port (12).

6. The oil duct part (1) according to claim 1, wherein the oil collection region (13a) of the oil duct part (1) comprises a second reservoir (14), wherein the second reservoir (14) has a second reservoir wall (27) and a second reservoir base (26), wherein the second reservoir (14) is connected with the first reservoir (13) via a connection channel (29).

7. The oil duct part according to claim 6, wherein a second drain (16) projects from the second reservoir wall (27) of the second reservoir (14) in a predetermined installation direction above the second reservoir base (26).

8. The oil duct part (1) according to claim 7, wherein a third drain (19) projects from the first reservoir wall (25) of the first reservoir (13) in the predetermined installation direction above the first reservoir base (26) on a side opposite the first drain (15) of the at least one drain (15a).

9. The oil duct part (1) according to claim 1, wherein the oil duct part (1) comprises a plurality of holder cams (23) projecting from the oil duct part (1), via which the oil duct part (1) can be mounted in a predetermined installation state in the transmission (100).

10. The oil duct part according to claim 9, wherein the plurality of holder cams (23) project from opposite sides of the oil duct part (1).

11. The oil duct part (1) according to claim 1, wherein the oil duct part (1) is configured as an insert part.

12. The oil duct part (1) according to claim 1, wherein the oil duct part (1) is configured to be mounted in the transmission (100) of a motor vehicle.

13. An oil duct part (1) to be mounted in a transmission (100), said oil duct part (1) comprising a conduit (2) with an inlet port (11) and an outlet port (12), wherein the conduit (2) has an oil conducting direction (F) from the inlet port (11) to the outlet port (12) and has a conduit wall (21) that is closed all around perpendicularly to the oil conducting direction (F), the oil duct part (1) further comprising at least one oil collection region (13a) for collecting oil conducted through the conduit (2), wherein the oil duct part (1) also comprises at least one drain (15a) for oil from the at least one oil collection region (13a), wherein the at least one oil collection region (13a) comprises a first reservoir (13), said first reservoir (13) having a first reservoir wall (25) and a first reservoir base (24), wherein the conduit (2) adjoins the first reservoir wall (25) of the first reservoir (13) in such a way that the first reservoir base (24) is arranged between the inlet port (11) and the outlet port (12) when viewed in the oil conducting direction (F) of the conduit (2), and wherein the oil duct part (1) comprises a plurality of holder cams (23) projecting from the oil duct part (1), via which the oil duct part (1) can be mounted in a predetermined installation state in the transmission (100).

14. The oil duct part according to claim 13, wherein the plurality of holder cams (23) project from opposite sides of the oil duct part (1).

15. The oil duct part (1) according to claim 14, wherein said oil duct part (1) is configured to be installed in the transmission (100) in a predetermined installation state defining an orientation of the oil duct part (1) relative to gravitational force (G), wherein, in an orientation that corresponds to the predetermined installation state, the first reservoir base (24) is orientated approximately perpendicular to the gravitational force (G) and the oil conducting direction (F) extends from the inlet port (11) to the outlet port (12) in an opposite direction to the gravitational force (G).

16. The oil duct part (1) according to claim 13, wherein one end of the conduit wall (21) of the conduit (2) facing away from the inlet port (11) forms a circumferential wall (21a) projecting above the first reservoir base (24) of the first reservoir (13) and delimiting the outlet port (12).

17. The oil duct part (1) according to claim 16, wherein the oil collection region (13a) of the oil duct part (1) comprises a second reservoir (14), wherein the second reservoir (14) has a second reservoir wall (27) and a second reservoir base (26), wherein the second reservoir (14) is connected with the first reservoir (13) via a connection channel (29), and wherein an edge of the circumferential wall (21a) on a side facing the first reservoir (13) has a distance from the first reservoir base (24) which is less than a distance of the edge of the circumferential wall (21a) from the second reservoir base (26) on a side facing the second reservoir (14).

18. The oil duct part (1) according to claim 13, wherein the conduit (2) is configured in a straight line from the inlet port (11) to the outlet port (12).

19. The oil duct part (1) according to claim 13, wherein the oil collection region (13a) of the oil duct part (1) comprises a second reservoir (14), wherein the second reservoir (14) has a second reservoir wall (27) and a second reservoir base (26), wherein the second reservoir (14) is connected with the first reservoir (13) via a connection channel (29).

20. The oil duct part (1) according to claim 13, wherein the oil duct part (1) is configured to be mounted in the transmission (100) of a motor vehicle.

* * * * *